Feb. 15, 1938.         J. A. ELMES           2,108,057
               TOOL GUIDE FOR DRILLING MACHINES
                  Filed Jan. 13, 1937      2 Sheets-Sheet 1
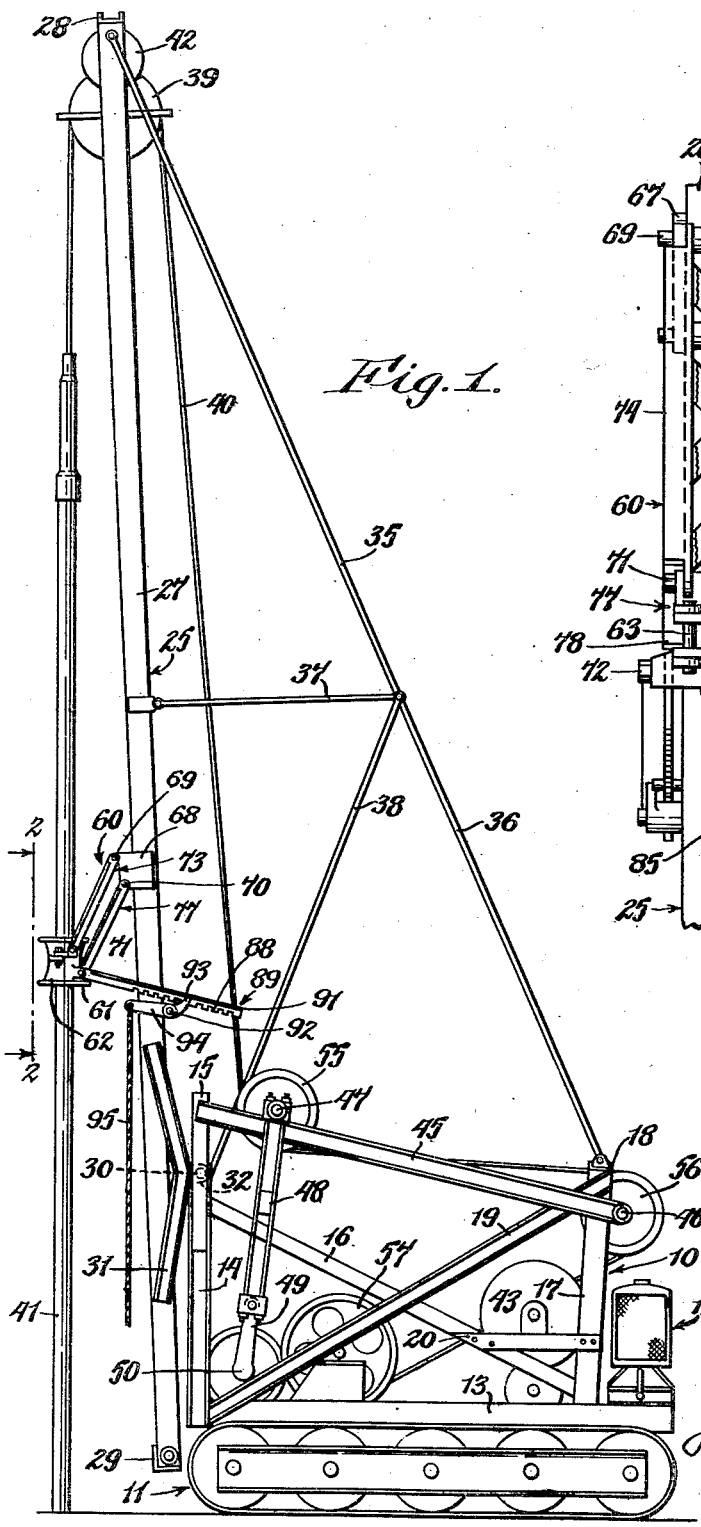

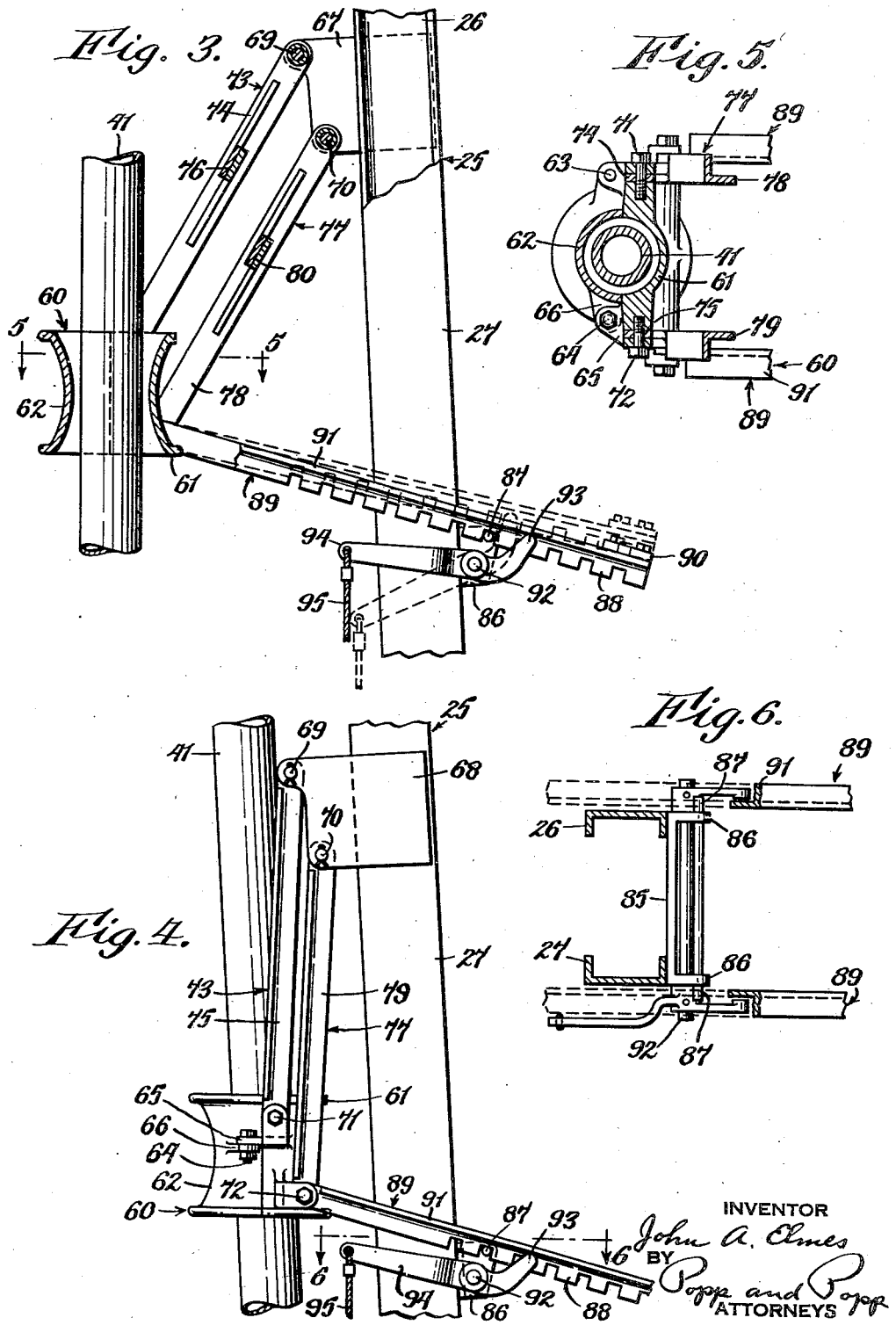

Patented Feb. 15, 1938

2,108,057

UNITED STATES PATENT OFFICE 2,108,057

TOOL GUIDE FOR DRILLING MACHINES

John A. Elmes, Beaver Falls, Pa., assignor to Keystone Driller Company, Beaver Falls, Pa., a corporation of Pennsylvania Application January 13, 1937, Serial No. 120,422

11 Claims. (Cl. 255—1)

This invention relates to a tool guide for drillers and more particularly to a movable guide for the drill of a portable driller, such as is used in drilling oil wells or the like, the guide serving to guide the drill during the first part of the drilling operation and being movable to hold the elevated drill out of the way while a bailing tool, sand pump or the like is being lowered into the hole and also being used to support the drill while the drilling machine is being transported from one place to another.

One of the principal objects of this invention is to provide such a tool guide which is carried on the derrick of the driller and in which the guide bell moves along the major axis of the drilling machine so that the tool is always disposed on this major axis instead of being swung to one side thereof. This facilitates the exchange in position of the drill and bailers or the like since the drill is not thrown to a twisted position to move it away from over the drill hole and also facilitates transportation of the driller with mast and tools raised since the heavy tool is supported on the major axis of the machine thereby reducing the danger of upsetting.

Another object is to provide such a tool guide which can be conveniently latched in any desired position, and also released, from the ground thus avoiding the necessity of the operator scaling the derrick in swinging the tool out of the way, latching the guide to hold the tool out of position, or returning the tool to position.

Another aim is to provide such a tool guide in which the guide bell is carried by a bracket of the double pantograph type so that in all positions of adjustment the bell is maintained in an upright position.

Other objects of the invention are to provide such a tool guide which is strong, durable and inexpensive in construction, is composed of few parts and is not liable to get out of order either in use or because of exposure to the elements, and will positively hold the heavy tool at any desired position along the major axis of the driller.

In the accompanying drawings:—

Fig. 1 is a side elevation of a crawler type driller equipped with a tool guide embodying my invention.

Fig. 2 is a fragmentary enlarged front elevation of the tool guide and the derrick on which it is mounted, the same being viewed from line 2—2, Fig. 1.

Fig. 3 is a fragmentary enlarged view similar to Fig. 1 showing the tool guide partly in section and the tool in its operative position.

Fig. 4 is a fragmentary enlarged view similar to Fig. 1 and showing the tool held in a rearward or retracted position.

Figs. 5 and 6 are horizontal sections taken on the correspondingly numbered lines on Figs. 3 and 4, respectively.

The tool guide forming the subject of this invention is shown as being mounted on a driller of the crawler type, although it will be understood that it can be used in connection with any type of driller.

The driller shown comprises a frame indicated generally at 10 suitably supported on crawlers indicated generally at 11 and carrying an internal combustion motor 12 which propels the driller and also furnishes power for the operation of the tools. The frame 10 includes main sills 13; front posts 14 carrying walking beam guides 15 and supported by braces 16; rear posts 17 jointly carrying a derrick rest 18 and supported by braces 19; a sand reel support 20 between each rear post 17 and the corresponding front post brace 16; and suitable jack sills and cross braces (not shown).

The derrick or mast, indicated generally at 25, is preferably capable of being laid back for convenience in transporting the driller and is shown as being of the latticed ladder type having two spaced steel channels 26, 27 connected by welded horizontal and diagonal braces (not shown) and connected at their upper and lower ends, respectively, by a channel 28 and angle bar 29. The derrick is supported by a pivot shaft 30 which is suitably secured to the derrick and braced by braces 31 and is journaled in bearings 32 at the upper ends of the front posts 14 of the frame.

The derrick is shown as being rigidly braced by means of tubular braces comprising a pair of top braces 35 connecting with the upper end of the derrick and at their lower ends with bottom rear braces 36 which connect with the derrick rest 18; horizontal center braces 37 connecting the center of the derrick with the joints between the braces 35 and 36 and diagonal braces 38.

At its upper end the derrick carries the usual crown sheave 39 which is preferably supported by suitable shock absorbers (not shown) and carries the line 40 which carries the drill 41. The derrick also carries at its upper end the usual sand line sheave 42 which supports the sand line (not shown) used for lowering sand pumps or the like into the hole, the other end of this sand line being wound upon a sand reel 43 driven by the motor 12 under suitable control.

The spudder mechanism for the driller includes a pair of walking beams 45 supported at their rear ends on a rear spudding shaft 46 mounted on the rear posts 17 and carrying at their front ends a front spudding shaft 47. The walking beams are guided by the walking beam guides 15. Each end of the front spudding shaft 47 is connected by a pitman 48 with a crank 49 on a crank shaft 50, this crank shaft being driven, under suitable control, by the motor 12 to operate the walking beam assembly during the spudding operation.

The line 40 from the crown sheave 39 passes under a sheave 55 on the front spudding shaft 47 and thence over a sheave 56 slidingly mounted on the rear spudding shaft 46 from which it passes to a drum 57. This drum, under suitable control, is driven through power derived from the motor 12 and is used to pay off the line 40 as the drilling progresses and also to hoist the drill.

The tool guide forming the subject of this invention is indicated generally at 60 and includes a rear half bell section 61 and a front half bell section 62, the two bell sections being hinged together as indicated at 63 and being latched together in any suitable manner as by a bolt 64 passing through an ear 65 on the rear bell section 61 and an ear 66 on the front bell section 62 when the bell sections are closed. The bolt 64 is removed and the front bell section swung open to receive the drill 41 after which the front bell section is closed and bolted to the rear bell section.

The guide bell is moved along the major axis of the driller so that the drill 41 is always supported on this axis and is held in an upright position by a double pantograph support. For this purpose plates 67 and 68 are secured to the outside of the channels 26 and 27 of the derrick and carry an upper pivot rod 69 and a lower pivot rod 70, the upper pivot rod 69 preferably being set in advance of the lower pivot rod 70. Similarly the rear bell section 61 is provided on its opposite sides with an upper pivot pin or screw 71 and a lower pivot pin or screw 72, the upper pivot pin 71 being set forwardly relative to the lower pivot pin 72. The upper pivots 69 and 71 are connected by an upper brace or link 73 composed of side bars 74 and 75 connected by lattice bars 76 and the lower pivots 70, 72 are connected by a link 77 of the same length as the link 73 and similarly composed of side bars 78, 79 connected by lattice bars 80. Since the rods 69 and 70 are held in fixed relation, it will be seen that this arrangement provides a double pantograph which maintains the guide bell at all times in a vertical position.

Below the plates 67, 68 a cross plate 85 is secured to the rear side of the derrick and is formed to provide rearwardly projecting flanges 86 carrying a rod forming outwardly projecting pins 87. Each of these pins is engaged by the square teeth 88 of a rack 89, the front end of each rack 89 being secured to one of the pins 70 and being cross connected at their free ends by a bar 90. Each rack 89 is also formed to provide an outwardly projecting longitudinal flange 91 which forms a slideway used in shifting the guide bell to different positions.

Below the pins 87, a cross shaft 92 is journaled in the flanges 86 of the plate 85 and at each end carries a horn 93 which is adapted to engage the underside of the corresponding flange 91 and lift the racks from engagement with the pins 87 and permit the guide bell to be adjusted forwardly or rearwardly. To permit of doing this from the ground, a lever 94 is fixed to one end of the shaft 92, this lever projecting in the opposite direction from the corresponding horn 93 and being operated by a pull cord 95 which hangs within convenient reach of the operator.

In the normal operation of the drilling the drill 41 is reciprocated vertically by the rotating crank 49 which oscillates the walking beam 45 and thereby moves the sheave 55 up and down so as to increase and decrease the effective length of the line 40 and hence periodically raise and lower the drill 41. As the drilling proceeds the line is gradually payed off from the drum 57 so as to lower the drill. Assuming that it is desired to remove the drill from the hole and lower a sand pump to remove the accumulated material, the operator raises the drill through the bell guide by taking up the line 40 on the drum 57. When the lower end of the drill 41 reaches a position above ground the operator draws down the cord 95 thereby rotating the shaft 92 and causing its horns 93 to engage the underside of the flanges 91 of the racks 89 and lift the teeth of these racks free from the pins 87. It will then be seen that the operator can swing the drill 41 to any desired position along the major axis of the drilling machine, the flanges 91 of the racks 89 riding on the elevated horns 93 of the tool guide release mechanism. In the usual operation the operator, having released the tool guide, swings the drill 41 toward the mast or derrick 25 and when the tool reaches the position illustrated in Fig. 4 he releases the draw cord 95 so as to permit the racks 89 to drop back into engagement with the pins 87. The engagement of the pins 87 with those teeth of the racks nearest the bell guide holds the drill 41 close to the derrick 25 and hence out of line with the drill hole. It is therefore possible to lower a sand pump (not shown), the sand line being payed off from the sand reel 43 and passing over the sand line sheave 42. After the sand has been removed the sand pump is emptied and moved to one side and the operator draws down the draw cord 95, thereby releasing the racks 89 from engagement with the pins and permitting the operator to draw the drill 41 back into position over the drill hole, the racks sliding along the tips of the horns 93. When the drill is so replaced in position the operator releases the draw cord 95 and permits the racks 89 to reengage with the pins 87.

It will be seen that the guide bell is at all times maintained in a vertical position by the double pantograph linkage and that the tool guide can be released and locked from the ground thereby avoiding the necessity of the operator scaling the derrick for this purpose. Also, the tool can readily be released from the tool guide by removing the bolt 64 and swinging the front half of the guide bell open so as to permit the drill to be swung out of the bell guide. It will also be noted that the tool is at all times maintained on the major axis of the machine and that therefore the driller can be readily transported from place to place without removing the drill, the drill being, in effect, lashed centrally to the mast or derrick so that the weight of the tool is always concentrated at the center line of the machine, thus maintaining constant equilibrium when traveling. By the provision of a guide moving along the major axis of the driller, in contradistinction to one swung to one side, the guide is rendered more easy to operate; less clearance is necessary at the front of the driller since no clearance need be provided except along the major axis of the driller, and the guide is rendered self-adjusting to a vertical position.

It will be seen that the present invention therefore provides a very simple, inexpensive and easily operable tool guide which will stand up under conditions of severe and constant use and will not get out of order through exposure to the elements.

I claim as my invention:—

1. A tool guide for a drilling machine having a derrick from which the tool is suspended, comprising a guide member for said tool arranged vertically in line with the major axis of the machine, a link connected with said guide member and derrick by pivots extending transversely relative to said major axis whereby said guide member is at all times disposed vertically in line with the major axis of the machine and means for holding said tool guide at different distances from said derrick.

2. A tool guide for a drilling machine having a derrick from which the tool is suspended, comprising a two-part guide bell the sections of which are separable to receive and guide said tool, said bell being arranged vertically in line with the major axis of the machine, a link connected with one of said guide bell sections and with said derrick by horizontal pivots extending transversely relative to said major axis whereby said guide bell is at all times disposed vertically in line with said major axis, and means for holding said guide bell at different distances from said derrick.

3. A tool guide for a drilling machine having a derrick from which the tool is suspended, comprising a two-part guide bell the sections of which are separable to receive and guide said tool, said bell being arranged vertically in line with the major axis of the machine, a pair of parallel links of equal length disposed one above the other and each connected with one of said guide bell sections and with said derrick by horizontal pivots extending transversely relative to said major axis whereby said guide bell is always maintained in a vertical position and at all times disposed vertically in line with said major axis, and means for holding said guide bell at different distances from said derrick.

4. A tool guide for a drilling machine having a derrick from which the tool is suspended, comprising a guide member for said tool and means for adjustably holding said guide member at different positions along the major axis of the machine comprising a rack pivoted to said guide member and having teeth adapted to engage an abutment on said derrick and means carried by said derrick for moving said rack to engage and disengage said teeth and said abutment.

5. A tool guide for a drilling machine having a derrick from which the tool is suspended, comprising a guide member for said tool and means for adjustably holding said guide member at different positions along the major axis of the machine comprising a rack pivotally connected to said guide member to swing about a horizontal axis and having teeth on its underside, an abutment on said derrick supporting said rack and engaging its teeth and means for lifting said rack to engage and disengage said abutment and teeth.

6. A tool guide for a drilling machine having a derrick from which the tool is suspended, comprising a guide member for said tool and means for adjustably holding said guide member at different positions along the major axis of the machine, comprising a rack pivotally connected to said guide member to swing about a horizontal axis and having teeth on its underside, an abutment on said derrick supporting said rack and engaging its teeth and means for lifting said rack to engage and disengage said abutment and teeth comprising a longitudinal flange provided on said rack, a lever pivoted to said derrick and having a horn adapted to engage the underside of said flange and lift the same and means for swinging said lever.

7. A tool guide for a drilling machine having a derrick from which the tool is suspended, comprising a guide member for said tool arranged vertically in line with the major axis of the machine, a link connected with said guide member and derrick by pivots extending transversely relative to said major axis whereby said guide member is at all times disposed vertically in line with the major axis of the machine and means for holding said tool guide at different distances from said derrick comprising a rack connected with said guide member and having teeth engaging an abutment provided on said derrick and means for manually engaging and disengaging said teeth and said abutment.

8. A tool guide for a drilling machine having a derrick from which the tool is suspended, comprising a guide member for said tool arranged vertically in line with the major axis of the machine, a link connected with said guide member and derrick by pivots extending transversely relative to said major axis whereby said guide member is at all times disposed vertically in line with the major axis of the machine and means for holding said tool guide at different distances from said derrick comprising a rack pivotally connected to said guide member to swing about a horizontal axis and having teeth on its underside, an abutment on said derrick supporting said rack and engaging its teeth and means for lifting said rack to engage and disengage said abutment and teeth.

9. A tool guide for a drilling machine having a derrick from which the tool is suspended, comprising a guide member for said tool arranged vertically in line with the major axis of the machine, a link connected with said guide member and derrick by pivots extending transversely relative to said major axis whereby said guide member is at all times disposed vertically in line with the major axis of the machine and means for holding said tool guide at different distances from said derrick comprising a rack pivotally connected to said guide member to swing about a horizontal axis and having teeth on its underside, an abutment on said derrick supporting said rack and engaging its teeth and means for lifting said rack to engage and disengage said abutment and teeth comprising a longitudinal flange provided on said rack, a lever pivoted to said derrick and having a horn adapted to engage the underside of said flange and lift the same and means for swinging said lever.

10. A tool guide for a drilling machine having a derrick from which the tool is suspended, comprising a guide member for said tool arranged vertically in line with the major axis of the machine, a link connected with said guide member and derrick by pivots extending transversely relative to said major axis whereby said guide member is at all times disposed vertically in line with the major axis of the machine and means for holding said tool guide at different distances from said derrick comprising a pair of racks pivoted to opposite sides of said guide member to swing about a horizontal axis, said racks being disposed on opposite sides of said derrick and each having teeth on its underside and also a longitudinal flange, a pair of pins carried by said derrick and projecting laterally outward therefrom to support said racks and engage said teeth, a rock shaft journalled on said derrick below said pins, a pair of horns fixed to said rock shaft and each adapted to engage the underside of the corresponding flange and lift said racks to disengage said teeth from said pins and means for turning said rock shaft.

11. A tool guide for a drilling machine having a derrick from which the tool is suspended, comprising a two-part guide bell the sections of which are separable to receive and guide said tool, said bell being arranged vertically in line with the major axis of the machine, a pair of parallel links of equal length disposed one above the other and each connected with one of said guide bell sections and with said derrick by horizontal pivots extending transversely relative to said major axis whereby said guide bell is always maintained in a vertical position and at all times disposed vertically in line with said major axis, and means for holding said guide bell at different distances from said derrick comprising a pair of racks pivoted to opposite sides of said guide member to swing about a horizontal axis, said racks being disposed on opposite sides of said derrick and each having teeth on its underside and also a longitudinal flange, a pair of pins carried by said derrick and projecting laterally outward therefrom to support said racks and engage said teeth, a rock shaft journalled on said derrick below said pins, a pair of horns fixed to said rock shaft and each adapted to engage the underside of the corresponding flange and lift said racks to disengage said teeth from said pins and means for turning said rock shaft comprising a lever on said rock shaft and a cord depending from said lever to a point within reach of one standing on the ground.

JOHN A. ELMES.